Feb. 2, 1943. J. G. WOLFF ET AL 2,310,008
APPARATUS FOR SETTING BUTTONS AND THE LIKE
Original Filed May 16, 1939    4 Sheets-Sheet 1

INVENTORS:
Jerome G. Wolff, Otto J. Huelster
and John E. Fagan
BY
ATTORNEYS.

Feb. 2, 1943.   J. G. WOLFF ET AL   2,310,008
APPARATUS FOR SETTING BUTTONS AND THE LIKE
Original Filed May 16, 1939   4 Sheets-Sheet 2

INVENTORS:
Jerome G. Wolff, Otto J. Huelster and
BY John E. Fagan,
Fraser, Myers & Manley
ATTORNEYS.

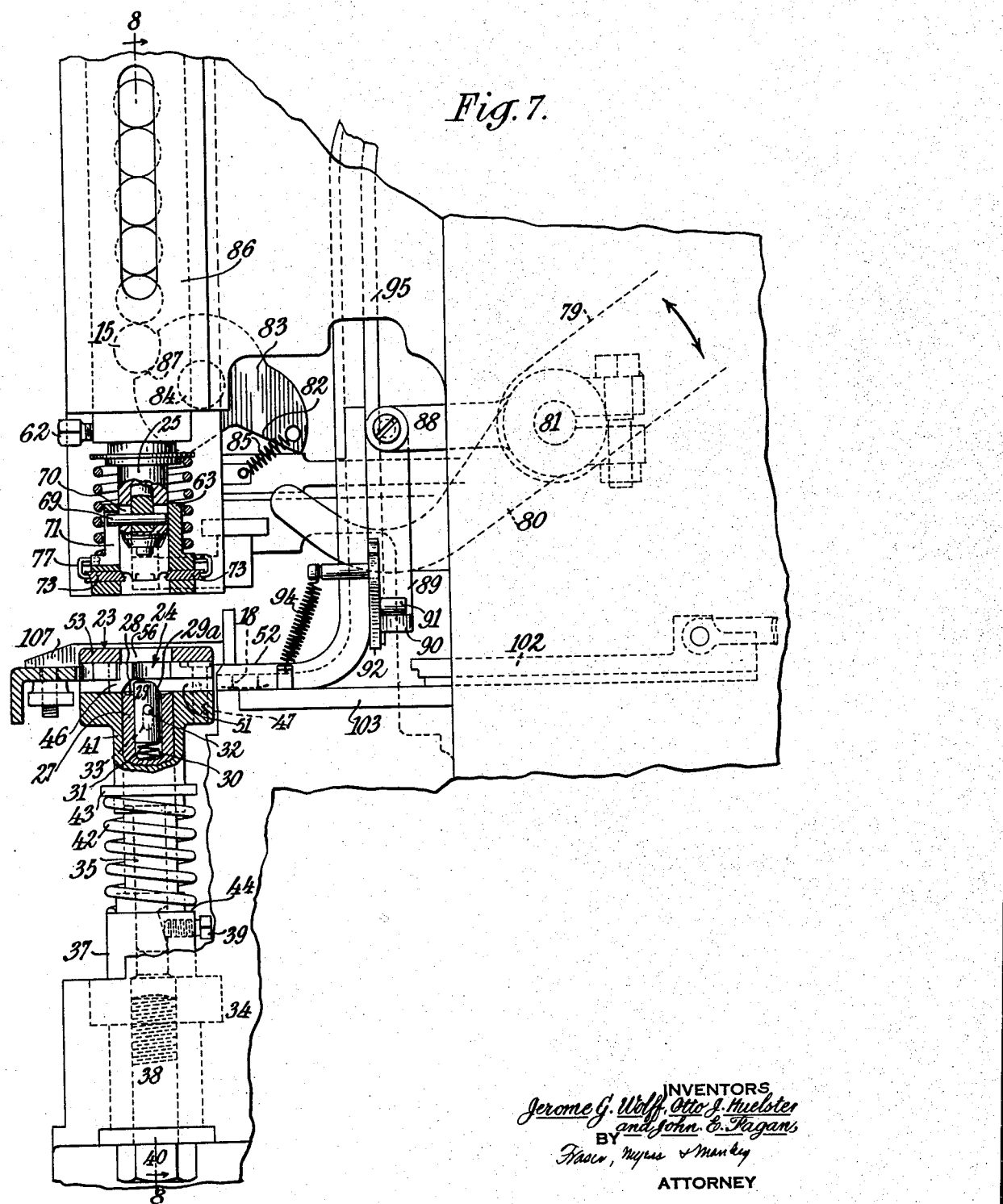

Feb. 2, 1943. J. G. WOLFF ET AL 2,310,008
APPARATUS FOR SETTING BUTTONS AND THE LIKE
Original Filed May 16, 1939 4 Sheets-Sheet 4
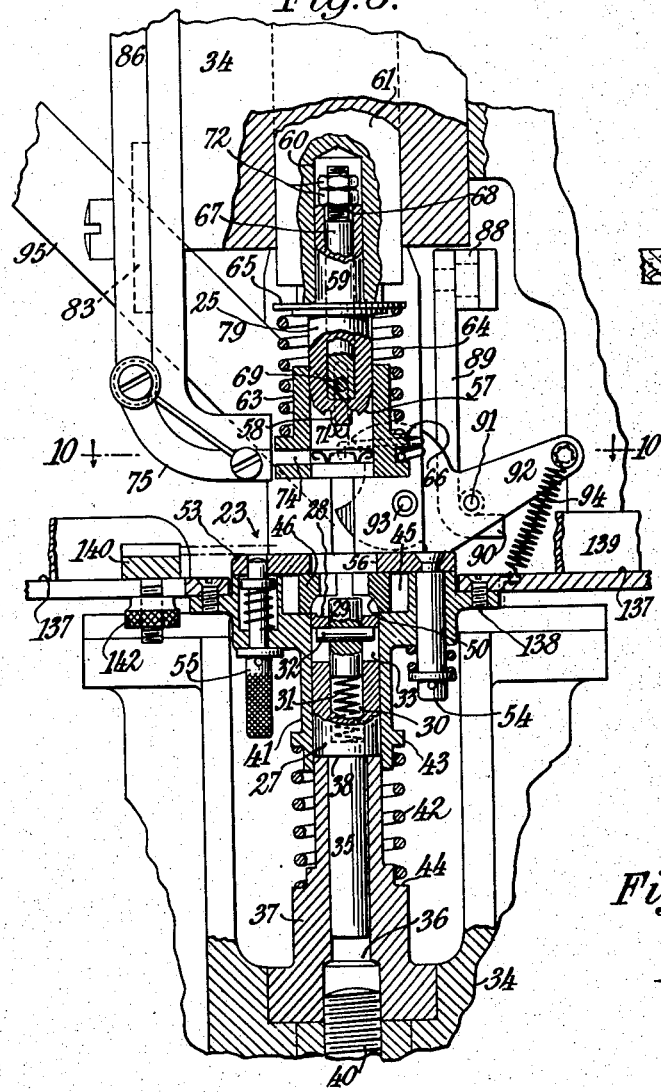
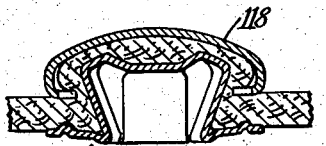
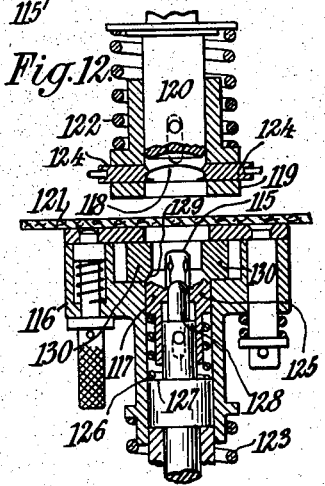
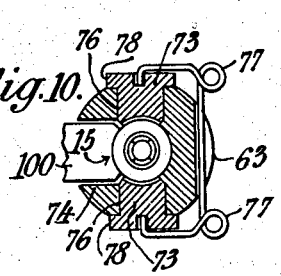
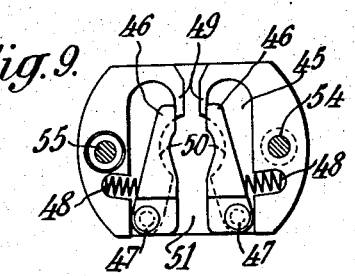
INVENTORS.
Jerome G. Wolff,
Otto J. Huelster and John E. Fagan
ATTORNEYS Patented Feb. 2, 1943

2,310,008

UNITED STATES PATENT OFFICE 2,310,008

APPARATUS FOR SETTING BUTTONS AND THE LIKE

Jerome G. Wolff, Otto J. Huelster, and John E. Fagan, Waterbury, Conn., assignors to Scovill Manufacturing Company, Waterbury, Conn., a corporation of Connecticut Original application May 16, 1939, Serial No. 273,926. Divided and this application July 16, 1941, Serial No. 402,572

18 Claims. (Cl. 218—6)

The present invention relates to the application of fastener elements to garments or other sheet-like articles on which they are customarily used, and is particularly concerned with improvements in fastener setting machines.

It is an object of the present invention to provide a machine which is adapted to carry out the steps of the method disclosed and claimed in co-pending parent application, Serial No. 273,926, filed May 16, 1939, in setting fastener elements upon their supporting sheets, and, more specifically, to provide a setting machine having means which are adapted to engage and hold a supporting sheet within an area surrounding and closely adjoining that upon which the fastener installation is to be made, and a pair of setting tools which are adapted to force a fastener member and its attaching cap together from opposite sides of the supporting sheet while it is so held, whereby any stretching of the sheet during this last-mentioned operation will be confined within that part of the sheet covered by the completed installation and, accordingly, cannot extend beyond the margins of the fastener element and cap to cause puckers and wrinkles in the surrounding material.

The full nature of the invention, including other objects and various features thereof, will be more fully understood from a consideration of the following description in the light of the accompanying drawings, in which:

Figure 1 is a sectional view of a completed snap fastener socket installation;

Figs. 2 to 5, inclusive, illustrate in more or less diagrammatic fashion the steps of the method of attaching a fastener element to its supporting sheet, with the practicing of which method the present invention is primarily concerned;

Fig. 7 is a sectional view taken on the line 7—7 of Fig. 6;

Fig. 8 is another sectional view of the machine of Fig. 6 taken on the line 8—8 of Fig. 7;

Fig. 9 is a plan view of the lower fabric clamping member of the machine of Figs. 6 to 8, the cap thereof having been removed better to illustrate the internal construction;

Fig. 10 is a sectional view taken on the line 10—10 of Fig. 8;

Fig. 11 is a sectional view of another form of socket member with the setting of which the present invention deals;

Fig. 12 is a sectional view of a part of a machine for setting snap fastener elements of the type illustrated in Fig. 11 and embodying the present invention;

Figs. 13 and 14 are sectional views similar to that of Fig. 12, and illustrating the positions of the various parts of the machine at different stages of the operating cycle.

Figure 1:
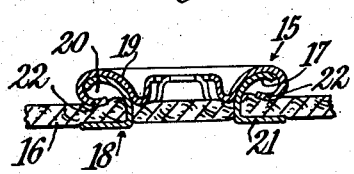
Figure 2:
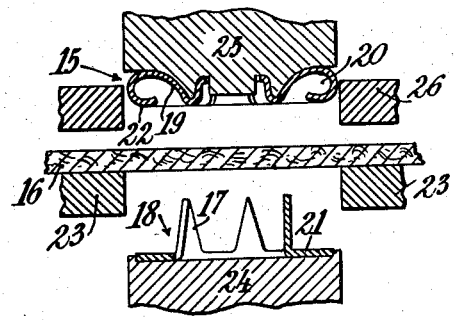

The fastener element 15 of Fig. 1 exemplifies the general class of device with the setting of which the present invention is particularly concerned. That element is the socket part of a complete snap fastener installation but it might just as well be a stud element adapted for engagement by the resilient fingers of the socket. It is set, in accordance with present practice, by disposing it upon one side of a sheet of fabric 16 and by then driving the prongs 17 of an attaching cap 18 through that sheet from its opposite side against the flaring anvil 19 of the element to turn them outwardly into the retaining ring 20 and to clamp the sheet material between the flange 21 of the cap and the opposing rear flange 22 of the element. The prongs of the cap in passing through the sheet necessarily stretch and draw the material to some extent thereby creating puckers and wrinkles. The presence of these unsightly wrinkles is made permanent when the stretched material is clamped between the flanges of the two elements. Thereafter they can neither be drawn nor ironed out.

In order to avoid this objectionable result the above identified parent application proposes a method wherein the sheet material is grasped within an annular area completely surrounding and closely adjoining that upon which the installation will be made, and is firmly held while the socket and cap elements are being applied. If this procedure is followed any stretching of the material must necessarily be confined within the area which will subsequently be covered. Upon the final setting of the elements their flanges will clamp the stretched material and prevent any drawing of the surrounding portions. Accordingly, when the sheet material is released, that part surrounding the installation must necessarily be free of puckers and wrinkles for the reason that no stretching or drawing thereof has been permitted.

Figure 3:
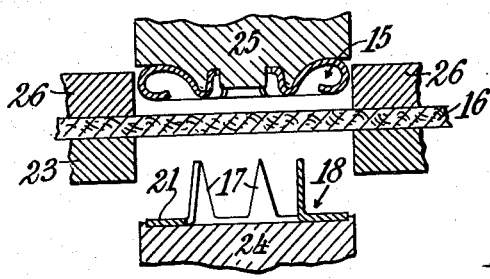
Figure 4:
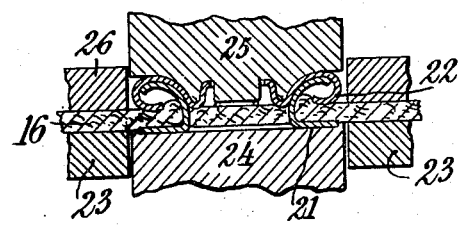
Figure 5:
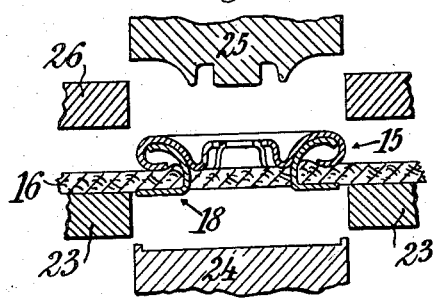

The method may better be understood by considering it with reference to Figs. 2 to 5, inclusive. In practicing it, the sheet 16 is placed upon a lower clamping ring 23 so that it lies between the attaching cap 18 supported on an anvil 24, and the socket member 15 which is disposed in cooperative relationship with the setting die 25. The position of these various parts at the beginning of the operation is thus illustrated in Fig. 2. As a first step in the method an upper clamping ring 26 is moved downwardly to clamp the sheet material between itself and the lower ring within an annular area immediately surrounding the anvil and setting die, as shown in Fig. 3. As the operation continues the anvil 24 and the setting die 25 are brought together to force the prongs of the attaching cap through the sheet and against the flaring anvil part of the socket, thus to turn them outwardly into the retaining ring 20. The passage of the prongs through the sheet of course results in the stretching of the material to some considerable extent, but all such stretching is necessarily confined within that part which is firmly held by the clamping rings. At the completion of the setting stroke, the intervening and stretched sheet material will be firmly clamped between the opposing flanges 21 and 22 of the cap and socket, as shown in Fig. 4. These flanges thus take up the function theretofore performed by the clamping rings 23 and 26. Accordingly, the clamping rings may now be withdrawn to the positions shown in Fig. 5. It will be evident that in the completed installation the stretched material is all confined within the area covered by the socket member and the attaching cap. The surrounding material is necessarily free from tension and therefore free of puckers and wrinkles.

A practical machine for carrying out the foregoing process is illustrated in Figs. 6 to 10, inclusive. Only those parts which are essential to a complete understanding of the machine are shown in the drawings for it is contemplated that they may be included as a part of any well known setting machine. One satisfactory form of machine to which they may be applied is shown in the Warner patent, No. 1,499,270. Reference may be had thereto for an understanding of the details of the operating mechanism and other parts not shown. The various constructional details of the essential parts of the machine embodying the present invention will now be considered and the entire structure will be correlated in the subsequent description of its operation.

The anvil unit of the machine is generally designated by the numeral 24 to conform with the diagrammatic showing of Figs. 2 to 5, inclusive. In this practical embodiment said anvil unit comprises a cylindrical member 27 having its upper end slightly recessed at 28 to receive the flange 21 of an attaching cap. This recess is necessarily shallow. In order to assure proper disposition of the cap therein the member 27 is provided with a locating pin 29 disposed within its central bore 30, such pin being adapted to fit within the central opening in the cap element and thus to hold it properly centered upon the anvil. It is necessary that the locating pin be removed or withdrawn from the position of Figs. 7 and 8 during the attaching operation to clear a path for other parts as will later be made evident. This can most conveniently be done by telescoping the locating pin with the member 27. In the preferred embodiment the pin is resiliently supported upon a spring 31 which urges it upwardly, and its vertical movements are limited by the engagement of the opposite ends of a wrist pin 32 carried by the locating pin, with the ends of slots 33 formed in the wall of the member 27.

The anvil member 27 is preferably so designed that it may readily and quickly be installed in the machine frame 34, or be removed for replacement by one of a different size or design. Accordingly it has a shank portion 35 of reduced cross section which is adapted to fit within a recess 36 of a boss 37 with its shoulder 38 engaging the upper end of the boss, and to be secured in that position by the tightening of set screw 39. The boss may be constructed as a part of the frame of the machine if desired. In the preferred structure, however, it is a separate element secured in place by a bolt 40.

The lower clamping ring is again generally designated by the numeral 23 in order that it may conform with the showing of Figs. 2 to 5. In this preferred embodiment it is formed by the upper end of a sleeve 41 which is slidably mounted upon the main body of the anvil member 27 and of the boss 37. The sleeve is supported in its normal position, that is, with its upper end lying above the upper face of the anvil, by a coil spring 42 which has its opposite ends engaging the collar 43 of the sleeve and the shoulder 44 of the boss 37.

The sleeve is designed to serve a further function in the completed machine—namely, as a part of an automatic cap feed mechanism. As may best be seen in Figs. 8 and 9, its enlarged head is recessed at 45 to accommodate a pair of cap holding arms 46. In the preferred embodiment these arms are pivoted to the sleeve at 47 for movement in a horizontal plane and are urged inwardly by springs 48 against the stop elements 49. It will be noted that the lower inner edges of the arms are undercut to provide cam faces 50 which overlie the upper end of the anvil member 27 as is particularly shown in Fig. 8.

Cap elements 18 may be fed into the head through a lateral opening 51 from an appropriate feed chute 52, all in a manner hereinafter fully considered.

The upper end of the sleeve in the preferred embodiment is covered by a plate 53 which is pivoted thereto at 54, and is held in its normal position by a spring pressed detent 55. If, as occasionally happens in operation, a cap becomes jammed in the head, the detent may be released and the cover swung about its pivot so that the jammed part can easily be removed. This cover plate, of course, has a central opening 56 through which the anvil member 27 may pass. It in fact constitutes the lower clamping ring of the machine.

The setting die 25 is designed for cooperation with the socket member 15. Accordingly its lower end face is appropriately shaped to complement the surfaces of that member. Thus, and as may be seen particularly in Fig. 8, it has a chamfered annular surface 57 which is adapted to engage the front surface of the anvil 19 of the socket, and a central pin 58 adapted to fit within the stud engaging recess defined by the resilient fingers of the socket. In order that the die may be quickly installed in the machine, it has an end portion 59 of reduced cross section adapted to fit snugly within the bore 60 of a plunger element 61 and to be secured therein by any appropriate means such as the set screw 62. The plunger is slidably disposed in the machine frame 34 in alignment with the anvil 24 and is adapted to be reciprocated by any appropriate mechanism (not shown). A suitable driving mechanism is illustrated in the Warner patent hereinbefore mentioned.

The upper clamping ring, again generally identified by numeral 26, is formed by the lower end of a sleeve 63 which is fitted over the setting die 25. In this preferred embodiment the sleeve is carried by the die and is also movable with respect thereto against the reaction of a coil spring 64 having its ends abutting against the collar 65 of the die and a shoulder 66 of the sleeve. The constructional details may best be seen in Figs. 7 and 8. There it will be noted that the die carries a suporting pin 67 in its central bore 68 and that the supporting pin in turn carries a cross pin 69 which extends through a longitudinal slot 70 in the wall of the die and into a longer slot 71 in the sleeve 63. The cross pin is thus the part which connects the sleeve to the die, and which determines the normal position of the sleeve by its engagement with the upper end of the slot 71. This normal position may be adjusted within limits by varying the positions of the lock nuts 72 which are threaded on the upper end of the supporting pin 67 and engage the upper end of the reduced portion 59 of the die.

The sleeve 63 is also designed to serve as a part of the automatic feed mechanism of the completed machine. It is accordingly provided with a pair of arms 73 (Fig. 10) which are adapted to receive socket parts 15 fed through a lateral opening 74 in the enlarged head of the sleeve from an appropriate feed chute 75, all in a manner hereinafter fully to be considered. The arms are arranged and constructed somewhat differently from those which have heretofore been considered in connection with the description of the lower sleeve 41, although identical arms might be used if desired. The arrangement is best shown in Figs. 7 and 10. There it may be seen that the arms 73 are relatively thin flat members which extend through radial slots 76 in the head and are urged inwardly by spring 77 so that their inner shaped ends may engage a socket member 15 and hold it in proper alignment with the complementally shaped end of the overlying die 25. Inward movement of the arms is limited by engagement of their flanged outer ends 78 with the outer surfaces of the sleeve.

The constructional details of these various parts, and of others not yet considered, may be better understood by a consideration of the operation of the machine through one complete setting cycle.

It will be assumed that a sheet of material has been placed upon the lower clamping ring 23 with that part upon which the installation is to be made accurately registered with respect to the anvil and setting die. The machine is then started. Immediately lever 79 is depressed to swing an arm 80 about its supporting shaft 81 so that the forward end of the arm may engage cam face 82 and rotate the cut-off element 83 about its supporting pin 84 against the tension of spring 85. This cut-off 83 is disposed in a raceway 86 through which socket parts are fed to the machine from any appropriate source. In the normal position of Fig. 7 its arcuate cut-out portion 87 engages and supports the entire stack of socket members 15. A quarter turn of the cut-off releases the lower one of the socket members and allows it to slide down the feed chute 75 to a point opposite the lateral opening 74 in the enlarged head of the upper sleeve member 63. The remaining socket members, however, are supported by the cut-off.

Simultaneously with this just-described action, the lever 79 rotates an arm 88 and lifts link 89 so that its lower offset end 90 may engage pin 91 and swing a cut-off 92 about its supporting pin 93 against the reaction of spring 94. This cut-off is located in a raceway 95 through which attaching caps are fed from any appropriate source. In its normal position it obstructs the raceway and prevents the descent of the caps. A quarter turn of this cut-off releases the lowermost one of the caps and allows it to slide down the feed chute 52 to a point opposite the lateral opening 51 in the enlarged head of the sleeve 41.

The two cut-off elements 83 and 92 complete their operative function by the release of one of the socket members and one of the caps. Accordingly at this point in the operation of the machine the lever 79 is lifted to retract the arms 80 and 88, and to permit the cut-offs to return to their normal positions under the influence of their springs 85 and 94, respectively.

In the next and second phase of the operating cycle, appropriate mechanism (not shown) swings an arm 96 (Fig. 6) about its point of pivotal support 97 to advance a push finger 98 along its supporting track 99. The forward and offset end portion 100 of the finger enters a slot 101 in the lower end of the chute 75 where it contacts the released socket member 15 and pushes it through the lateral opening 74 in the head of sleeve 63. The end of the push finger may best be seen in Fig. 10. The rounded outer edges of the socket engage the chamfered ends of the fingers 73 in the head and spread those fingers very slightly so that the socket may pass therebetween. At the completion of this feed stroke the socket member will be held between the curved portions of the fingers 73 immediately beneath the end of the setting die 25 in the position shown in Fig. 7.

Simultaneously with the feeding of the socket elements, the mechanism of the machine advances a second push finger 102 along its track 103, the forward end of the finger entering a slot in the under side of the chute 52 to contact the released cap element 18 and to push it through the lateral opening 51 in the head of the sleeve 41. As the cap advances the edges of its flange engage the undercut cam surfaces 50 of the receiving arms 46 and spread those arms against the resistance of springs 48. Further advance of the cap brings its forward edge against the chamfered face 29a of the locating pin 29. This chamfered face acts as a cam and lifts the cap. It can not tip over, however, because it is otherwise confined by the spring pressed arms 46. At the completion of the feed stroke the opening in the cap 18 registers with the centering pin, and the cap is forced downwardly by the arms 46 to seat on the upper end of the anvil.

Figure 6:
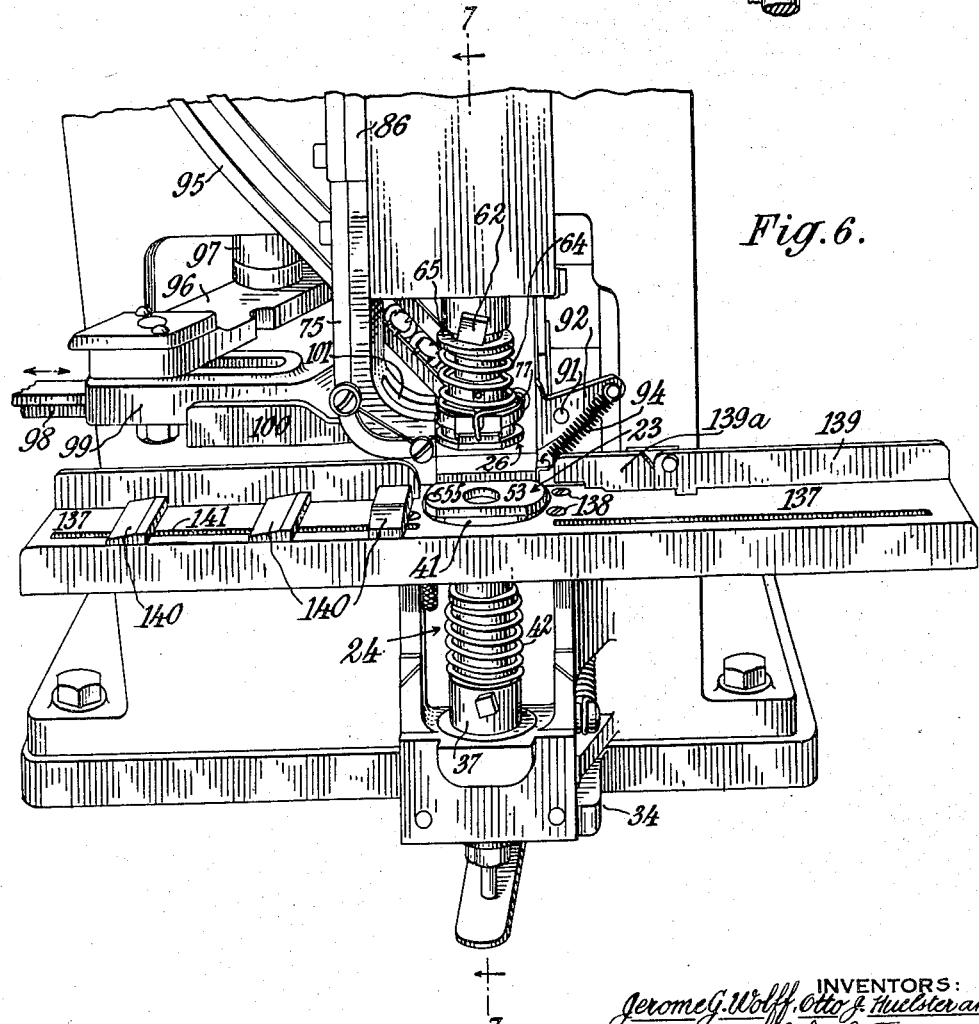
Fig. 6 is a perspective view of a part of a button setting machine embodying the present invention.

The second phase of the operating cycle has now been completed and the two push fingers 98 and 102 may be retracted to their initial positions, as shown in Figs. 6 to 8.

In the next and third phase of the operating cycle the plunger 61 is caused to descend carrying with it the setting die 25 and the sleeve element 63. This action brings the lower end of the sleeve 63 against the sheet material which is disposed on the upper end of the sleeve 41 and effectively clamps the sheet therebetween. It may thus be seen that the opposing ends of the two sleeves correspond in function to the clamping members generally designated at 23 and 26 in Figs. 2 to 5, inclusive.

Further descent of the plunger 61 causes the two sleeves to slide with respect to the anvil and setting die against the reaction of springs 42 and 64. The setting die accordingly engages the socket 15, strips it free of its supporting arms 73, and presses it firmly against the upper surface of the supporting sheet. In the simultaneous downward movement of the lower sleeve 41 the edges of the relatively stationary anvil engage the cam surfaces 50 of the arm 46 and spread those arms to clear a path for the subsequent passage of the anvil through the opening 56 in the cover plate, or clamping ring. At this stage the centering pin 58 of the descending die, acting through the intervening sheet, engages the upper end of the centering pin 29 of the anvil and telescopes that pin within the anvil against the tension of its supporting spring 31. At the same time, of course, the prongs of the attaching cap are being forced through the sheet and against the anvil 19 of the socket to turn them outwardly into the retaining ring of that element.

It will again be noted that the prongs stretch the sheet as they pass therethrough, but that all such stretching is confined to that part of the sheet which will be covered by the cap and socket member, the surrounding portion being firmly held between the opposing ends of the two sleeves. At the completion of the setting stroke, the stretched material will be firmly clamped between the opposing flanges 21 and 22 of the cap and socket respectively. Hence the sleeves may be returned to their initial positions without releasing any stretched part of the material. The material surrounding the completed socket installation will be found to be wholly free of puckers and wrinkles.

Figure 14:
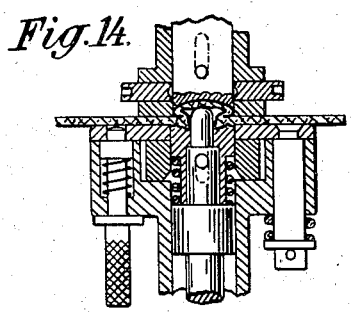

In the foregoing it has been assumed that the part to be set was a socket element of the type shown in Fig. 1. The principles of the invention are applicable, however, to the setting of almost any element which by reason of its design effects a stretching of the sheet material during the attaching operation. To do so it is merely necessary to install setting tools of proper character in the machine of Figs. 6 to 8, and to provide that machine with feed chutes capable of accommodating the parts to be set. One other such element is shown in Fig. 11; and a die, an anvil, and clamping elements for use in setting it in accordance with the present invention are illustrated in Figs. 12 to 14, inclusive. These tools are generally similar to the like elements of Figs. 6 to 10, inclusive. Their constructional details may be fully understood from a consideration of the setting operation.

The feeding of a socket element 115 into the head of sleeve 116, and the positioning of the member upon the anvil 117 may be substantially identical with that heretofore described in connection with Figs. 6 to 8, inclusive. So too with the feeding of a cap 118 into the head of the sleeve 119 surrounding the setting die 120. It will therefore be assumed that the parts are in the positions shown in Fig. 12. As the operating cycle of the machine continues, the setting die is brought downwardly so that the lower end of sleeve 119 clamps the sheet material 121 against the upper end of sleeve 116. Further descent of the die element causes both of the sleeves to slide upon their supporting parts against the reaction of springs 122 and 123. During this movement of the sleeves with respect to the setting die and anvil, several things happen. The die strips cap 118 from its supporting fingers 124 and presses it firmly against the upper surface of the sheet. Simultaneously the lower sleeve 116 depresses the movable portion 125 of the anvil against the reaction of its spring 126 until its lower end engages shoulder 127, thereby allowing the relatively stationary centering pin 128 of the anvil to enter the barrel of the socket member 115. Thereafter the edges of the movable part 125 engaging the undercut surface 129 of the spring pressed socket positioning arms 130, spread those arms so that the anvil may pass between them. Further downward movement of the setting die and the sleeves forces the sheet material into the cap 118. The positions of the various parts at this intermediate stage of the operating cycle are illustrated in Fig. 13. During the final part of the setting stroke the barrel portion of the socket element will be collapsed within the attaching cap, trapping the stretched sheet material and clamping it between the opposing flanges of the socket element and the cap, all as shown in Fig. 14. The setting die and the sleeves may now be retracted without releasing any stretched part of the sheet material and the material surrounding the installation will again be found to be free of puckers and wrinkles.

Figure 15:
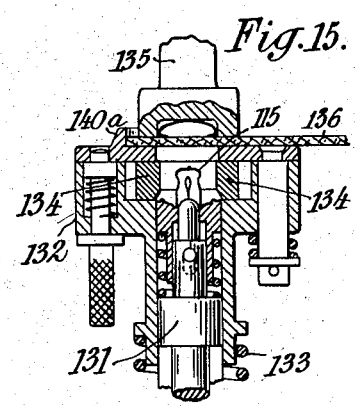
Fig. 15 is a sectional view of another machine for setting fastener parts of the type illustrated in Fig. 11 and embodying the principles of the invention in a modified form.

The invention has heretofore been considered in its application to setting machines having means for automatically positioning socket and cap elements in proper relation to the setting tools during each operating ciycle. If the feed mechanism is omitted, either from the anvil or the setting die, then one of the two sleeves may also be omitted. The part which has no sleeve will then serve its customary function and, in addition, as a clamping ring. The essential parts of such a machine are shown in Fig. 15. There the anvil 131 carries a sleeve 132 resiliently supported upon spring 133; and it will be noted that the sleeve is provided with a pair of socket receiving and positioning arms 134. These parts are in all material respects identical with the anvil and sleeve of Figs. 12 to 14, inclusive. Socket elements 115 may be fed thereto through a lateral opening in the sleeve either automatically or in any other desired way. Attaching caps 118 will be supplied to the setting die 135 by hand, or at least they will be positioned upon the supporting sheet 136 prior to the commencement of the setting operation. This setting die requires no associated sleeve. The operation of the machine, including these setting tools, is substantially identical with that of Figs. 12 to 14. The only real difference lies in the fact that the lower end of the setting die 135 engages the sheet material directly and clamps it against the upper end of the lower sleeve 132. It thus performs the function of a clamping ring as well as that of a setting die.

Any one of these various machines may be provided with a table 137, as shown in Figs. 6 to 8, inclusive, for supporting the sheet material prior to and while a fastener element is being applied. In the preferred embodiment the table is bolted directly to the sleeve, as indicated at 138, with its upper surface disposed just beneath the edge of the cover plate 53 so that it will not interfere with the lateral movement of the cover plate to gain access to the enlarged head of the lower sleeve 41. In this preferred arrangement then, the table is adapted to move up and down with the sleeve during the attaching operation to support the sheet material in proper alignment with the upper end of the clamping member 23 at all times. It is further preferred that the table be provided with a rail 139 having a gate 139a therein which may be lifted to gain access to the feed chute 95 when it becomes jammed; and a series of stop elements 140, the latter having threaded pin portions passing through longitudinal slot 141 in the table for engagement by thumb screws 142. The function of these parts is to serve as guides for locating the sheet material accurately with respect to the anvil and setting die so that the fastener installation may be made at the proper point. Thus, and assuming that the stop elements have been first adjusted, it is merely necessary to place the sheet material upon the table with one of its edges resting against the rail 139 and with its end abutting the first one of the stop elements 140. In that position the sheet will be accurately located with respect to the setting tools, and the operation of the machine will effect the application of the socket member thereon at the desired point. If additional members are to be applied the sheet may be successively advanced until its end abuts the second, third and other stop members 140, the machine, of course, being operated to apply a fastener member at each position.

Where but a single member is to be applied to each piece of sheet material, the table 137 may be omitted. In such case the upper end of the lower sleeve must serve in its stead. It will then be found desirable to provide the sleeve with a stop element or gage plate 140a (Fig. 15) against which the edge of the sheet may be placed to locate it accurately with respect to the setting tools.

Since certain changes may be made in the embodiment of the invention, it is intended that the foregoing shall be construed in a descriptive rather than a limiting sense.

What we claim is:

1. A fastener setting machine comprising a pair of setting tools disposed one above the other in axial alignment with their opposing ends adapted to cooperate with a fastener member and an attaching element, a sleeve closely surrounding the lower tool with its upper end normally disposed above the free end of that tool to serve as a support for material to which a fastener member is to be applied, means within said sleeve for holding an attaching element in cooperative relation with said lower tool, a second sleeve closely surrounding the upper tool with its lower surface normally disposed below the lower free end of that tool, means within the second mentioned sleeve for holding a fastener member in cooperative relation with said upper tool, and means for advancing one of the sleeves towards the other to clamp sheet material disposed between them with enough firmness to prevent the extension of any stretching of the central ungrasped material to the surrounding portions, for then advancing one of the tools towards the other to force a fastener member and attaching element into locking relation and to clamp the intervening sheet material between opposing marginal flanges of such member and element, and for subsequently retracting both the tool and the sleeve so that the sheet material may be withdrawn from the machine.

2. A fastener setting machine comprising an anvil and a setting die disposed in axial alignment with their opposing ends adapted to cooperate with a fastener member and an attaching element, a sleeve telescoped over the anvil, a spring for supporting said sleeve with its upper end normally disposed above the upper end of the anvil to provide a support for a piece of sheet material to which the fastener member is to be applied, means in said sleeve for holding an attaching element in cooperative relation with said anvil, a second sleeve telescoped over and carried by the setting die with its lower end normally disposed below the lower end of the die, a spring for urging said second sleeve to the normal position with respect to the die, means in said second sleeve for holding a fastener member in cooperative relation with said die, means for advancing said setting die to cause said second sleeve to clamp the sheet material against the first mentioned one within an annular area surrounding said anvil and said setting die, and to cause both sleeves to move against the reaction of their supporting springs whereby the setting die and anvil may cooperate in forcing a fastener member and attaching element into locking relation and in clamping the intervening part of the sheet material between opposing flanges of such fastener and attaching element, and means for then retracting said setting die to allow both of such sleeves to return to their normal positions under the influence of their supporting springs.

3. A fastener setting machine according to claim 2, further characterized in that the means in each of the said sleeves comprises a pair of arms having their opposing faces shaped to receive a member to be set therebetween, and resilient means for urging such arms toward each other, such arms being located in the heads of their respective sleeves so as to lie between the opposing ends of the anvil and setting die when such sleeves are in their normal positions.

4. A fastener setting machine according to claim 2, further characterized in that the means in each of said sleeves comprises a pair of arms mounted in the head of that sleeve and having inner opposed cam faces, resilient means for urging such arms inwardly so that their cam faces are disposed in cooperative relation with the edges of the adjacent anvil and setting die elements when said sleeves are in their normal positions, and means for limiting the inward movement of said arms.

5. A fastener setting machine according to claim 2, further characterized in that said sleeves have lateral feed openings therein, feed chutes having their delivery ends disposed opposite such lateral openings when such sleeves are in their normal positions, means for feeding a fastener member from one of said chutes through the lateral opening in one of said sleeves, means for feeding an attaching member from the other of said chutes through the lateral opening in the other of said sleeves, and in that the means in each of said sleeves are adapted to receive members fed thereto and to hold them in cooperative relation to said anvil and setting die.

6. A fastener attaching machine according to claim 2, further characterized in that each of said sleeves has a lateral feed opening therein, and in that the means in each of said sleeves comprises a pair of arms disposed within the head of such sleeve to receive a member fed through such opening, said arms having inner cam faces, and resilient means for urging such arms toward each other so that their cam faces are disposed in cooperative relation with the edges of the adjacent anvil and setting die elements when said sleeves are in their normal positions.

7. A fastener attaching machine according to claim 2, further characterized in that the sleeve for the anvil has a lateral feed opening therein, and in that the means in said sleeve comprises a pair of arms disposed within the head of such sleeve to receive members fed through such opening when said sleeve is in its normal position, said arms being pivoted to said sleeve for movement in a horizontal plane and having opposing inner cam faces, resilient means for urging such arms inwardly to cause such cam faces to overlie the edge of the anvil when the sleeve is in its normal position, and means for limiting inward movement of said arms.

8. A fastener setting machine according to claim 2, further characterized in that the sleeve for the anvil has a lateral feed opening therein, in that the means in said sleeve comprises a pair of arms disposed within the head of said sleeve for receiving members fed through such opening when the sleeve is in its normal position, resilient means for urging such arms inwardly, and by the provision of a cover plate serving as the head of such sleeve, said cover plate being pivotally attached to said sleeve so that it may be swung sidewise to gain ready access to said arms.

9. A fastener setting machine according to claim 2, further characterized in that said second sleeve for the setting die has a lateral feed opening therein, and in that the means in said second sleeve comprises a pair of arms disposed radially within the head of said sleeve, said arms having their opposing inner ends shaped to receive a member fed through such lateral opening when the sleeve is in its normal position and to hold it in cooperative relation beneath the setting die, resilient means urging such arms inwardly, and stop elements formed on the outer ends of such arms for limiting their inward movement.

10. A fastener setting machine according to claim 2, further characterized by the provision of a work supporting table attached to and movable with the sleeve surrounding the anvil.

11. A fastener setting machine according to claim 2, further characterized by the provision of a work supporting table attached to and movable with the sleeve surrounding the anvil, such table having a rail along one edge and a plurality of stop elements disposed crosswise thereof, and means for adjusting the positions of said stop elements lengthwise of said table, said rail and stop elements being adapted to serve as guides for the edges of a piece of sheet material to locate that material accurately with respect to said anvil and setting die.

12. In a fastener setting machine, a setting tool comprising a central part having its forward end shaped to cooperate with a fastener part, a sleeve slidably mounted upon said central part and having an unbroken ring-like forward end face and spring means for urging said sleeve to a normal position at which its forward end face is displaced ahead of the forward end of said central part, said spring being adapted to cause said sleeve to clamp a sheet of flexible material between its end face and the face of an opposing member with enough firmness to prevent the extension of any stretching of the held material beyond the clamped area prior to and while a fastener member is being applied to the material by said central part.

13. In a fastener setting machine, a setting tool according to claim 12, characterized in that said sleeve has an enlarged head having a lateral opening therein through which a fastener part may be fed into cooperative relation with the end of said central part when said sleeve is in its normal position and wherein said enlarged head has a pair of arms mounted therein for receiving a fastener part fed through said lateral opening when said sleeve is disposed in its normal position, and spring means for urging said arms inwardly to hold such fastener part in cooperative relation with the shaped end of said central part.

14. A fastener setting tool including an anvil comprising a central pin, a member surrounding said pin with its end surface shaped to receive a fastener part, said pin and member being slidably mounted one with respect to the other, and spring means for supporting the slidable one of said parts; a sleeve slidably mounted on said anvil with its forward end surface adapted to serve as a ring against which a fastener supporting sheet may be clamped, and a spring for urging said sleeve to a normal position at which its forward end surface lies ahead of the end of said pin and member parts of said anvil; said sleeve having a lateral opening therein through which a fastener part may be fed into cooperative relation with the end of said anvil when said sleeve is in its normal position.

15. A fastener setting tool according to claim 14, further characterized in that said pin is slidably mounted in said surrounding member of said anvil, and in that said first-mentioned spring supports said pin with its free end disposed ahead of said surrounding member.

16. A fastener setting tool according to claim 14, further characterized in that said pin is slidably mounted in said surrounding member of said anvil; in that said first-mentioned spring supports said pin with its free end disposed ahead of the shaped end surface of said surrounding member; in that said pin has a sloping end surface opposite said lateral opening, which surface is adapted to lift the edge of a fastener part fed through said lateral opening in said sleeve; and by the provision of a pair of arms in the head of said sleeve for receiving such fastener part fed through said lateral opening, and spring means for urging said arms inwardly to cause them to center such fastener part upon said pin.

17. A fastener setting tool according to claim 14, further characterized in that said surrounding member is slidably mounted upon said central pin, and in that said first-mentioned spring means supports said surrounding member with its shaped end surface substantially aligned with the end of said pin.

18. In a fastener setting machine, a pair of setting tools disposed in end-to-end relation for cooperation with a fastener element and an attaching part, a pair of sleeves each slidably mounted upon one of said tools, spring means for urging said sleeves towards each other to such positions that their opposing end faces normally lie between the opposing ends of said tools, each of said sleeves having a lateral opening therein through which a fastener element and an attaching part may be fed when said sleeves are in their normal position, a pair of arms mounted in each of said sleeves and in cooperative relation with the lateral opening therein for receiving fastener part fed therethrough, and spring means for urging each said pair of arms inwardly whereby one pair may hold a fastener element and the other pair an attaching part in cooperative relation with the ends of said tools.

JEROME G. WOLFF.
OTTO J. HUELSTER.
JOHN E. FAGAN.